United States Patent [19]

Voges

[11] 4,225,007
[45] Sep. 30, 1980

[54] SPEED-RESPONSIVE DEVICE FOR INTERNAL COMBUSTION ENGINE WITH PIVOTED PLATE CLAPPER TYPE CHECK VALVE BETWEEN CRANKCASE AND INTAKE MANIFOLD

[76] Inventor: Fred W. Voges, 234 Northwoods Rd. Flower Hill, Manhasset, N.Y. 11031

[21] Appl. No.: 785,590

[22] Filed: Apr. 7, 1977

[51] Int. Cl.³ .............................................. B60K 27/08
[52] U.S. Cl. .................................... 180/284; 123/320
[58] Field of Search ...................... 123/97 B, 102, 142, 123/127, 121; 180/277, 279, 284

[56] References Cited

U.S. PATENT DOCUMENTS

| | | | |
|---|---|---|---|
| 2,208,673 | 7/1940 | Hopkins | 123/119 R |
| 2,264,097 | 11/1941 | Neeper | 180/284 X |
| 2,273,058 | 2/1942 | Miller | 180/284 |
| 2,639,701 | 5/1953 | Bales | 123/119 B |
| 2,681,051 | 6/1954 | Robinson | 123/119 B |
| 2,741,233 | 4/1956 | McKinley | 123/97 B |
| 2,776,722 | 1/1957 | Germanich | 123/97 B |
| 2,793,001 | 5/1957 | Gallun | 123/97 B |
| 3,550,717 | 12/1970 | Doty, Jr. | 180/284 |

Primary Examiner—John J. Love
Assistant Examiner—Norman L. Stack
Attorney, Agent, or Firm—Allison C. Collard; Thomas M. Galgano

[57] ABSTRACT

An internal combustion engine having a carburetor equipped with the usual throttle valve means controlling the flow of air-fuel flow to the intake manifold is provided with a normally open cut-off valve means located between the throttle valve and intake manifold to close communication therebetween when it is moved to closed position. A vehicle speed responsive device is operatively connected to the cut-off valve to move it to the closed position whenever the vehicle is coasting or moving under closed throttle valve conditions at or below a predetermined vehicle speed. In addition, there is provided a conduit between the intake manifold and the crank case with a pivoted plate clapper type check valve therein to permit flow from the crank case into the intake manifold.

3 Claims, 3 Drawing Figures

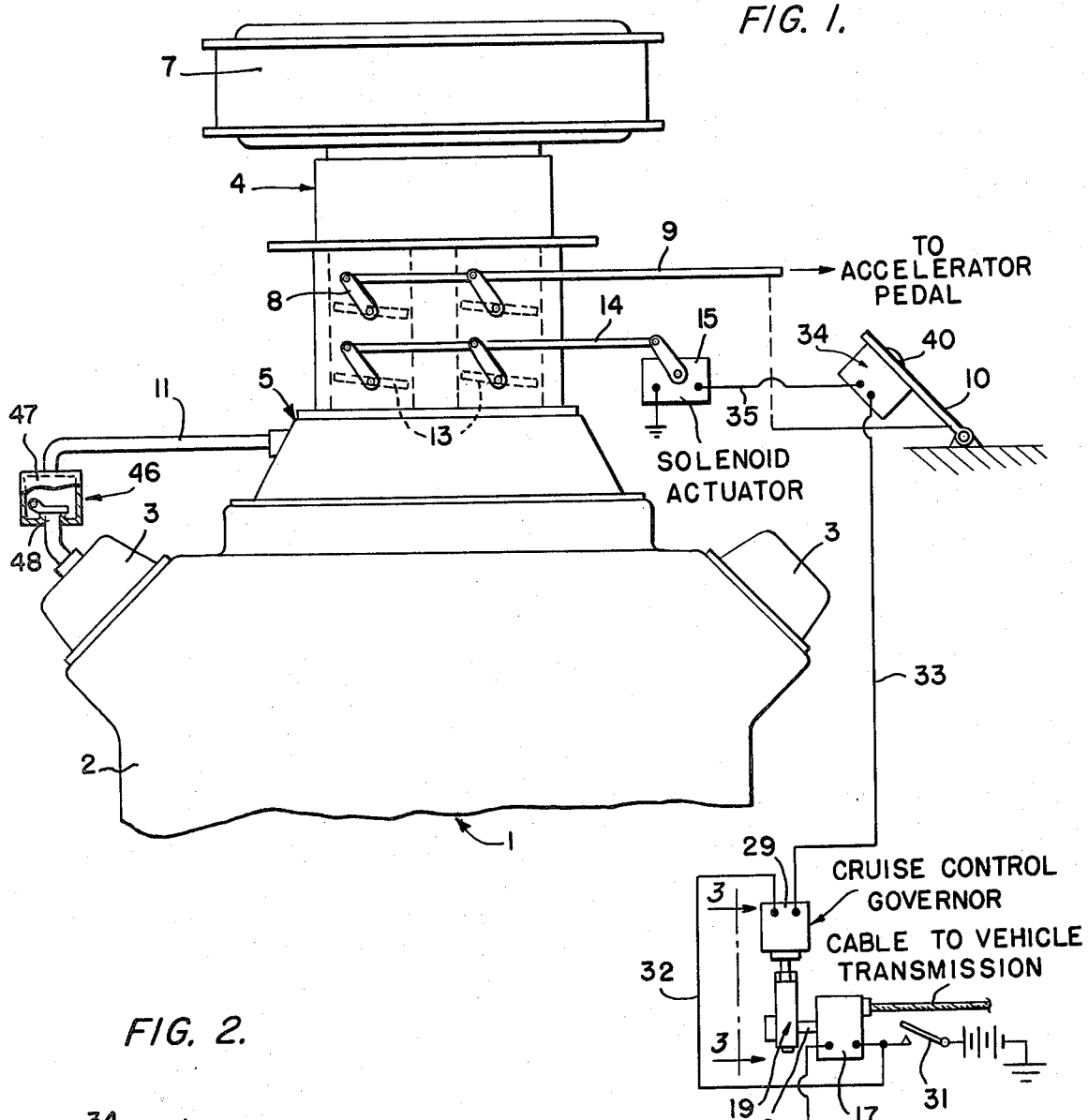
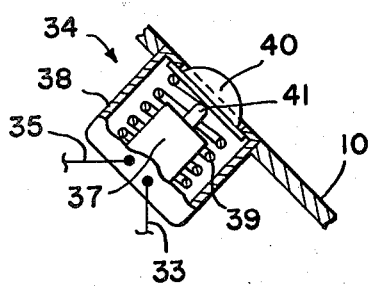
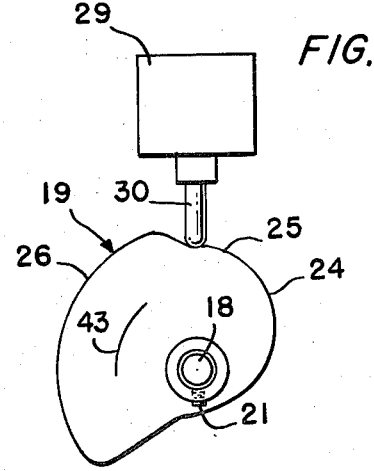

SPEED-RESPONSIVE DEVICE FOR INTERNAL COMBUSTION ENGINE WITH PIVOTED PLATE CLAPPER TYPE CHECK VALVE BETWEEN CRANKCASE AND INTAKE MANIFOLD

CROSS REFERENCE TO RELATED APPLICATIONS

The related application is that of Fred W. Voges entitled "Speed-Responsive Valve Control For Intake Manifold To Crankcase In Internal Combustion Engine."

BACKGROUND OF THE INVENTION

1. Field of the Invention

This invention relates to an improvement in internal combustion engines to decrease engine wear and pollution and increase fuel and oil economy. More particularly the invention relates to speed-responsive device for internal combustion engine with pivoted plate clapper type check valve between crankcase and intake manifold. The invention also lies in the field of a governor controlled throttle valve system for cutting off the idling mixture at coasting speeds whereby new cooperation is achieved between the throttle pedal and the governor controlled system.

2. Description of the Prior Art

Heretofore P.C.V. valves have been used in order to assist crankcase ventilation.

U.S. Pat. No. 3,839,996 discloses the overall combination of an internal combustion engine operating under increased efficiency and power output having a crankcase, intake valve cover closed and sealed to hold a vacuum, wherein the one-way valve 62 allows communication from the valve cover 53 to the intake system 28 but precludes communication from the intake system to the valve cover. Note that the intake vacuum closely corresponds to the vacuum developed in each combustion chamber on the intake stroke of the piston. The system also provides for a pressure gage which can be connected to the oil filler port, to ascertain whether the crankcase is operating at a vacuum.

U.S. Pat. Nos. 3,455,285, 3,587,544, 3,677,240 and 3,923,024 are cited as of interest in disclosing an internal combustion engine having a crankcase breather system illustrating various additional features such as a V-block engine and various types of P.C.V. valves arranged downstream of the throttle valve.

All of the prior art mentioned hereinabove does not correlate the throttle controlling the vehicle speed to the vacuum which exists within the crank case 50 and it is the object of the present invention to provide a governor controlled circuit which provides equalization of the intake manifold pressure in the crank case at a desirable and practical vehicle operating speed whether accelerating, coasting, or decelerating and in this manner to achieve greater engine efficiency without in any way interfering with the fuel mixture ratio. Because of the closed system there is cooler operation of the vehicle, smoother performance in acceleration and deceleration and lower maintenance requirements.

BRIEF DESCRIPTION OF THE DRAWING

In the drawings:

FIG. 1 is a schematic view of the arrangement of the several elements of the invention applied to a conventional internal combustion engine.

FIG. 2 is a cross sectional view of the switch means located on the accelerator pedal.

FIG. 3 is an elevational view taken on line 3—3 of FIG. 1.

DESCRIPTION OF THE PREFERRED EMBODIMENTS

Referring to FIG. 1, internal combustion engine 1 is provided with the usual crankcase portion 2, valve cover means 3 and carburetor 4 sitting on and connected to the intake manifold means 5. The carburetor is provided with the usual air filter 7 and has the conventional throttle valve means 8 connected to the accelerator rod 9. The throttle valve means is illustrated as a double valve for a two barrel type carburetor. Rod 9 is connected to an accelerator pedal 10, as schematically illustrated in FIG. 1.

A conduit means, represented by a pipe 11, is connected at one end to valve cover 3 and at the other end to intake manifold 5. The inside of valve cover 3 is connected to the interior of the crankcase by the usual drain passage means, a construction which is well known in the art. The crankcase is sealed from the atmosphere.

A cut-off valve means 13 is located between the throttle valve means 8 and intake manifold 5 to control communication therebetween. Valve means 13 is illustrated at two valves interconnected by rod means 14 to act as a single unit as throttle valve means 8, since the invention is illustrated as applied to a multi-barrel carburetor. Obviously valve means 13 may be any form of a conventional two-way valve means to either open or close the communication between the conventional throttle valve and intake manifold.

An electric actuator 15 which may be a conventional solenoid or other forms of electro-motor device is connected by rod means 14 to valve means 13 to move it to open or closed position, the valve being normally open.

The actuation of valve 13 is responsive to the speed of the vehicle. A speed responsive device 17 which may be of any type speed responsive governor means, is driven by a conventional speedometer cable connected to the vehicle transmission, or any other power take-off capable of registering vehicle speed in miles per hour. Governor 17 may also be the usual cruise control governor means found on many vehicles. Governor 17 is provided with an output member, such as shaft 18. The degree of rotation of shaft 18 in response to the speed of the vehicle is a measure of the speed. A cam 19 is angularly adjustable on shaft 18 by a set screw 21 in the hub of the cam as illustrated in FIG. 2.

As shown in FIG. 3, cam 19 is a lobed disc which has peripheral portion 24 which rises gradually in a curve 25 to a peripheral lobe or portion 26 which is of constant radius with the center of shaft 18.

Cam 19 operates a switch device 29 through a switch operating rod 30. Switch 29 may be in the form of microswitch. The scale of FIG. 3 is exaggerated to better disclose the mechanical details. Switch 29 is connected to a source of current, such as the vehicle battery, by wire 32 and a manual switch 31 which also connects device 17 to the source when device 17 is the usual cruise control means. Switch 29 is connected by a wire 33 to a switch device 34 positioned on accelerator pedal 34. Switch 34 is connected by a wire 35 to actuator 15.

Switch device 34, illustrated in FIG. 2 comprises a normally closed microswitch 37 in a housing 38 secured on pedal 10. A spring 39 urged a plunger 40 located above operating rod 41 for switch 37. In the released position of accelerator pedal 10, the vehicle operator's foot does not exert any pressure on plunger 40 and the parts assume the positions illustrated in FIG. 2, that is, spring 39 acts on plunger 40 to move it away from rod 41 to permit switch 37 to close.

At start or low vehicle speed, rod 30 rests on peripheral portion 24 of cam 19 and in that position switch 29 is open. As vehicle speed picks up, cam 19 will be rotated clockwise, in direction of arrow 43, until cam portion 26 is reached. At that point rod 30 has been moved to the position to close swtich 29 and remain closed in view of the constant radius of lobe 26 as the vehicle moves at a speed about the predetermined low speed, at, say, 20-25 miles per hour.

Cam 19 is adjustable to vary the speed at which valve 13 opens. As shown in FIG. 2, by loosening set screw 21, cam 19 may be rotated on shaft 18 anti-clockwise to move the beginning of lobe 26 away from the point where rod 30 contacts cam 19 on portion 24, and thus raise the speed at which switch 29 is closed.

Moving cam 19 on shaft 18 clockwise would cause switch 29 to close at a lower speed and thus close valve 13 at a lower vehicle speed.

As long as the accelerator pedal 10 is depressed to drive the vehicle above the predetermined low vehicle speed switch 37 is open, since the operator's foot in depressing the pedal also acts to depress plunger 40 to move rod 41 to open the normally closed switch 37. However, as soon as the operator releases pedal 10 to either stop the vehicle or to permit it to coast, switch 37 recloses and completes the circuit from the electric source, wire 32, closed switch 29, wire 33, closed switch 37 and wire 35 to actuator 15. Actuator 15 is energized and moves valve means 13 to closed position to cut off communication between the throttle valve means and intake manifold, as shown in FIG. 1. Thus, as the vehicle coasts above the predetermined low vehicle speed no idling fuel mixture reaches the intake manifold. If the pedal is again depressed switch 37 is reopened and actuator 15 is deenergized to permit valve means 13 to move into open position.

If the pedal is released to slow down or stop the vehicle, cam 19 will move anti-clockwise and when the vehicle speed is such that rod 30 moves off lobe 26 into portions 24-25, that is, the vehicle moves to below the predetermined speed, switch 29 is reopened and thus breaks the closed circuit to actuator 15. Actuator 15 is thereby deenergized and valve means opens to permit communication between the throttle valve and intake manifold to permit the engine to idle.

Manual switch 31 may be used to control governor 17, especially if it is a cruise control device, to render it inoperative if so desired. Switch 31 may also be used to control the current connection to switch 29.

The conduit means in the form of a pipe 11 connects valve cover 3 and intake manifold 5. A clapper type check valve 46 is inserted in pipe 11 to permit flow from the valve cover and crank case to the intake manifold.

Valve 46 comprises clapper or pivoted plate 47 biased by its weight to seat on valve seat 48. Upon a predetermined vacuum condition in the intake manifold clapper 47 will be opened by the differential pressures acting thereon to move it off its seat to permit flow from the crank case to the intake manifold. In its open position clapper 47 is above its seat and acts somewhat as a deflector to the flow of fluid. Thus, oil particles or oil vapor in the flow will tend to be deflected back into the valve cover section and thereby stop or reduce the oil contents of the flow to the intake manifold. The check valve 46 tends to act as an oil separator in addition to its general check valve function as a P.C.V. to control communication between the crank case and intake manifold.

Although a particular embodiment of the invention has been shown and described for the purpose of illustration, it will be evident that various changes and modifications may be made therein without departing from the scope and spirit of the invention.

I claim:

1. In an internal combustion engine for driving a vehicle, said engine having a crank case, an intake manifold, a carburetor, a throttle valve means controlling air-fuel mixture flow from the carburetor into the intake manifold and a throttle valve linkage means connecting the throttle valve means and accelerator pedal, a cut-off valve means located between the throttle valve means and the intake manifold to control the flow of air-fuel mixture to the intake manifold, said cut-off valve means being normally in an open position, valve actuating means comprising an electro-magnetic device connected to said cut-off valve means to move it to an open or closed position, and two serially-arranged control means to energize said valve actuating means to move said cut-off valve means to a position to close communication between said throttle control means and intake manifold, the first of said control means being a first normally closed switch which is responsive to the accelerator pedal position, said first switch being located adjacent to the accelerator pedal and being provided with means to be effected by the operator's foot pressure on the pedal upon movement of the pedal in vehicle driving direction to open the switch, said first switch being reclosed when the pedal returns to engine idling position upon release thereof, and the second of the said control means being a second normally closed switch which is responsive to a predetermined vehicle speed and is serially connected to said first switch, said second control means also including a speed governor having an output member and an operative connection between said output member and said second switch, said operative connection moving the switch to its closed positon upon a predetermined movement of the output member and said output member being adjustable in relation to the operative connection to vary the predetermined movement of the output member.

2. The engine of claim 1 wherein the output member is a rotary cam adjustably secured to a shaft of the vehicle speed responsive device, said cam having a lobed surface engaging the operative connection.

3. The engine of claim 1 wherein said speed governor is a cruise control governor.

* * * * *